(12) United States Patent
Kim

(10) Patent No.: US 9,975,497 B2
(45) Date of Patent: May 22, 2018

(54) HOLDER FOR HOLDING PORTABLE DEVICE

(71) Applicant: Sehhan Kim, Seoul (KR)

(72) Inventor: Sehhan Kim, Seoul (KR)

( * ) Notice: Subject to any disclaimer, the term of this patent is extended or adjusted under 35 U.S.C. 154(b) by 0 days. days.

(21) Appl. No.: 15/420,328

(22) Filed: Jan. 31, 2017

(65) Prior Publication Data

US 2017/0136960 A1    May 18, 2017

Related U.S. Application Data

(63) Continuation-in-part of application No. 15/148,093, filed on May 6, 2016, now Pat. No. 9,586,530.

(30) Foreign Application Priority Data

May 8, 2015    (KR) .................... 10-2015-0064766

(51) Int. Cl.
  *B60R 11/00*  (2006.01)
  *B60R 11/02*  (2006.01)
  *F16M 11/08*  (2006.01)

(52) U.S. Cl.
  CPC ......... *B60R 11/0241* (2013.01); *F16M 11/08* (2013.01); *B60R 2011/0071* (2013.01)

(58) Field of Classification Search
  CPC ..... B60R 11/00; B60R 11/02; B60R 11/0241; B60R 2011/0071; B60R 2011/0064; B60R 2011/0075; B60R 2011/008; B60R 2011/0084
  USPC ................................. 224/570, 567
  See application file for complete search history.

(56) References Cited

U.S. PATENT DOCUMENTS

| | | | |
|---|---|---|---|
| 5,396,556 A * | 3/1995 | Chen .................... | B60R 11/0241 379/426 |
| 5,593,124 A * | 1/1997 | Wang ..................... | B60R 11/00 224/483 |
| 5,836,563 A | 11/1998 | Hsin-Yung | |
| 5,860,824 A * | 1/1999 | Fan ..................... | B60R 11/0217 439/165 |
| 5,903,645 A | 5/1999 | Tsay | |
| 5,979,724 A * | 11/1999 | Loewenthal, Jr. .. | B60R 11/0241 224/483 |
| 6,320,962 B1 | 11/2001 | Eisenbraun | |
| 6,360,083 B1 | 3/2002 | Fan | |

(Continued)

FOREIGN PATENT DOCUMENTS

KR    10-1326687    11/2013

*Primary Examiner* — Brian D Nash
(74) *Attorney, Agent, or Firm* — Sand & Sebolt

(57) ABSTRACT

A holder for holding a portable device on an air-outlet grille of a vehicle. The holder includes a body portion having a fixed pad supporting one side of the portable device; a moving portion having a moving pad that is linearly movable between first and second positions; an elastic plate that restricts movement of the moving pad at the second position; a depressible button to release the moving pad from a fixed state to a movable state. The moving pad contacts the opposite side of the portable device which is then retained between the fixed and moving pads. A tongs portion, having a tongs clip, a coupling clip, and a tongs holder, secures the body portion to the air-outlet grille. A spring compressed when the moving pad moves from first to second position, moves the moving pad back towards the first position when the button is depressed.

18 Claims, 12 Drawing Sheets

(56) References Cited

U.S. PATENT DOCUMENTS

| | | |
|---|---|---|
| 6,366,672 B1 | 4/2002 | Tsay |
| 7,418,097 B2 | 8/2008 | Chang |
| 8,191,851 B2 | 6/2012 | Crown |
| D690,707 S | 10/2013 | Minn et al. |
| 9,080,714 B2 | 7/2015 | Minn et al. |
| 2004/0179678 A1 | 9/2004 | Li |
| 2005/0236536 A1 | 10/2005 | Fan |
| 2006/0061993 A1 | 3/2006 | Fan |
| 2006/0278788 A1 | 12/2006 | Fan |
| 2007/0262223 A1 | 11/2007 | Wang et al. |
| 2012/0199621 A1 | 8/2012 | Yoon |
| 2012/0267061 A1 | 10/2012 | Fan |
| 2012/0267406 A1 | 10/2012 | Fan |
| 2014/0103087 A1* | 4/2014 | Fan ................. B60R 11/02 224/544 |
| 2014/0138418 A1* | 5/2014 | Dunn ............... B60R 11/02 224/483 |
| 2014/0138419 A1* | 5/2014 | Minn ............... B60R 11/0241 224/567 |
| 2015/0072555 A1 | 3/2015 | Riddiford et al. |
| 2015/0274088 A1 | 10/2015 | Minn et al. |

* cited by examiner

HOLDER FOR HOLDING PORTABLE DEVICE

CROSS-REFERENCE TO RELATED APPLICATIONS

This application is a Continuation-in-Part of U.S. patent application Ser. No. 15/148,093 filed May 6, 2016, the entire disclosure of which is incorporated herein by reference. U.S. patent application Ser. No. 15/148,093 claims priority from Republic of Korea Application Serial No. KR 10-2015-0064766, filed May 8, 2015.

FIELD OF THE DISCLOSURE

The present disclosure relates to a holder for holding a portable device, more specifically to a holder capable of holding a portable device inside a vehicle.

BACKGROUND OF THE DISCLOSURE

In general, portable devices, such as navigation, PMP, PDA, DMB players, electronic dictionary, cellular phone, and the like, have been minimized so that they can not only be hand-held, but also be used inside a vehicle by using a holder. Following the development of technology, portable devices have been equipped with a variety of additional functions such as navigation, playing music and videos, games, camera, schedule management, dictionary, and the like, to meet users' diverse requirements, and even provide functions of information retrieval and adding new applications.

These portable devices can be held by a holder and used inside a vehicle. For example, Korean Patent No. 10-1326687 discloses a portable device holder to be used inside vehicles. This holder can hold a portable device when an elevation holding member is manually pushed while the portable device is placed inside the holder. This requires the drivers of the vehicles to use their both hands to manipulate the holder to hold the portable device, and therefore it would not only be difficult to place the portable device to the holder while driving, but it is also troublous to go through the plurality of steps involved in placing and removing the portable device to and from the holder.

SUMMARY OF THE DISCLOSURE

One aspect of the present disclosure is to provide a holder for holding a portable device, with which a user could easily hold the portable device just by performing a simple series of movements.

Another aspect of the present disclosure is to provide a simple structured holder for holding a portable device.

One exemplary embodiment of the present disclosure is a holder for holding a portable device which is used to hold a portable device inside a vehicle, the holder comprising: a body portion having a fixed pad which supports one side of the portable device when the portable device is placed thereon; a moving portion having a moving pad which is linearly movable between a first position, which supports the other side of the portable device when placed on the body portion, and a second position, which is spaced apart from the other side of the portable device at a predetermined distance; an elastic plate which holds the movement of the moving pad at the second position; and a button which is pushed by the portable device in the process of placing the portable device onto the body portion, to release the moving pad from a fixed state to a movable state, wherein the moving portion may further comprise a spring which is compressed while the moving pad moves from the first position to the second position, and the moving portion may further comprise a spring which moves the moving pad back to the first position from the second position by an elastic force.

The body portion further comprises: a body which is engaged with the fixed pad, and provided with a guide groove, which is where the spring is located, formed on a top surface thereof; and a cover which covers the top surface of the body, and is provided with a button hole, which is where the button is to be inserted, and the moving portion further comprises: a moving base which is engaged with the moving pad; a moving shaft which is inserted into the spring, with one end engaged with the moving base; and a push portion which is fixedly engaged with the other end of the moving shaft, and further includes a fixing clip provided with a fixing protrusion, the elastic plate being disposed on a lower portion of the button; and a stopper portion, which is where a fixing groove is stopped when the moving pad is located at the second position.

The elastic plate comprises a first region which is in close contact and fixed to the body; a second region which extends in an upwardly inclining manner from one side of the first region; and a third region which extends from one side of the second region while maintaining a predetermined distance from the body, wherein the push portion and the stopper portion are provided in the third region.

The button may have a protruded height so that it is protruded over the top surface of the cover.

The spring is provided as a pair, two springs arranged side by side in parallel with each other along a moving direction of the moving pad; the moving shaft is provided as a pair, each shaft inserted into the respective spring; and the fixing clip has a first engagement region, which is where the other end of one of the moving shafts is engaged with, a second engagement region, which is where the other end of the other moving shaft is engaged with, and a fixed region, which is where the fixing protrusion is provided, the fixed region connecting the first engagement region and the second engagement region; and the button is disposed between the pair of moving shafts.

A distance between the fixed pad and the first position corresponds to one width of the portable device, and a distance between the fixed pad and the second position may be wider than one width of the portable device.

In a holder for holding a portable device according to another aspect of the present disclosure, a moving pad is moved to a position that is wider than the width of the portable device, a button is pushed when the portable device is placed onto the cover while the moving pad is fixed to said position, such fixed state of the moving pad is released by the push of the button, and the moving pad moves linearly to a position that corresponds to the width of the portable device, thereby securely holding the portable device.

A spring may be further comprised, which is compressed when the moving pad moves to a position where the interval distance is wider than the width of the portable device, and provides elastic force when the fixed state of the moving pad is released, whereby the moving pad is moved to a position corresponding to the width of the portable device.

The button protrudes over the top surface of the cover, and may further include an elastic plate which stops the movement of the moving pad by catching the fixing protrusion of the fixing clip at a position that is wider than the width of the portable device, and releases the engagement with the fixing protrusion when pressed together with the button.

The elastic plate includes a first region; a second region which extends in an upwardly inclining manner from one side of the first region; and a third region which extends from one side of the second region in a direction parallel with the first region, a push portion, which is where the lower end of the button is placed, and a stopper portion, which is where the fixing protrusion is caught when the moving pad has moved to a position having an interval distance that is wider than the width of the portable device.

As described above, the button is pressed by the portable device while it is being placed for holding. Accordingly, with the holder of the present disclosure, only a simple action is required of the user.

Further, since the portable device is held by using a combination of an elastic plate and a fixing clip, the holder has a simple structure.

According to the present disclosure, a tongs portion is provided to the holder without using an adhesive. Therefore, the holder is easy to assemble.

In one aspect, an embodiment of the present disclosure may provide an apparatus for holding a portable device comprising a body portion on which the portable device is placed, the body portion comprising: a fixed pad for supporting a first side of the portable device when the portable device is placed thereon; a moving portion having a moving pad that is linearly movable between a first position and a second position; wherein the moving portion supports a second side of the portable device when placed on the body portion, and wherein the second position is spaced a predetermined distance from the first position; an elastic plate that restricts a movement of the moving pad at the second position; a button depressible by the portable device when the portable device is placed onto the body portion, said button releasing the restriction of the movement of the moving pad caused by the elastic plate; and a tongs portion coupled to a lower region of the body portion, wherein said tongs portion is adapted to secure the body portion to an air-outlet grille on a vehicle; and wherein the tongs portion comprises a tongs clip, a coupling clip, and a tongs holder; wherein the tongs clip is engaged with the tongs holder, wherein the tongs holder is adapted to engage with the air-outlet grille, and wherein the coupling clip secures the tongs clip to the body portion.

In another aspect, an embodiment of the present disclosure may provide a method of holding a portable device on an air-outlet grille on a vehicle comprising steps of: a) providing a holder that has a body portion with a fixed pad and a moving pad; and a tongs portion extending outwardly from the body portion; wherein the tongs portion comprises a tongs clip, a coupling clip; and a tongs holder; wherein the tongs clip is engaged with the tongs holder and wherein the coupling clip secures the tongs clip, and the tongs holder to the body portion, b) inserting a grille from the air-outlet grille into a space defined between a pair of holder legs provided on the tongs holder, c) clamping the grille between the holder legs, d) moving the moving pad of the body portion away from the fixed pad, e) positioning a first side of the portable device against the fixed pad of the body portion of the holder, f) depressing a button provided on the body portion of the holder with the portable device, g) moving the moving pad on the body portion toward the fixed pad thereon, h) engaging a second side of the portable device with the moving pad, and i) clamping the portable device between the moving pad and the fixed pad.

In another aspect, an embodiment of the present disclosure may provide a method of holding a portable device on an air-outlet grille on a vehicle comprising steps of: a) providing a holder that has a body portion having a fixed pad and a moving pad, wherein the moving pad is movable between a first position and a second position, an elastic plate adapted to restrict movement of the moving pad at the second position, a button that is depressible to release the elastic plate and permit movement of the moving pad; and a tongs portion engaged with the body portion; b) inserting a grille from the air-outlet grille into a space defined between a pair of legs provided on the tongs portion; c) securing the grille between the pair of legs; d) moving the moving pad of the body portion away from the fixed pad and into the second position; e) positioning a first side of the portable device against the fixed pad; f) depressing the button provided on the body portion with the portable device; g) moving the moving pad towards the fixed pad and towards the first position; h) engaging a second side of the portable device with the moving pad; and i) clamping the portable device between the moving pad and the fixed pad.

DETAILED DESCRIPTION OF THE PREFERRED EMBODIMENTS

Figure 1:
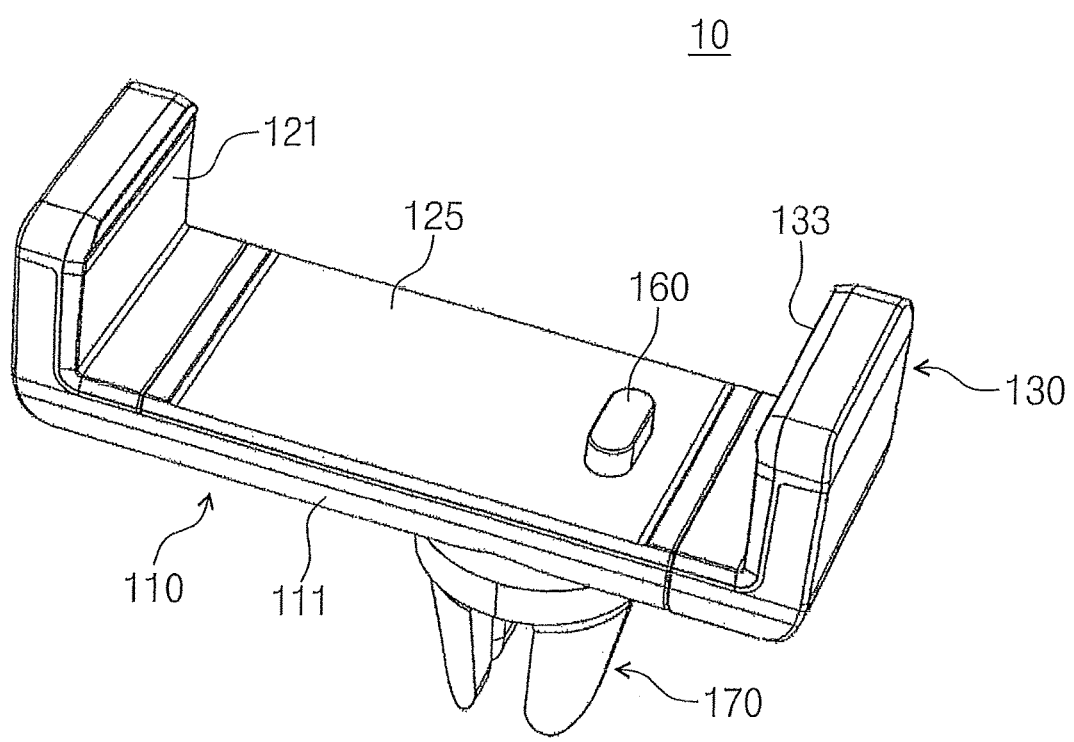
FIG. 1 is a perspective view of a first embodiment of holder for holding a portable device according to one exemplary embodiment of the present disclosure.

Herein, preferred embodiments of the present disclosure will be explained with reference to the accompanying drawings. However, the technical concept of the present disclosure is not limited to the embodiments described here, and may be specified into having different forms. It is to be understood that the following embodiments are only provided so that the contents of the present disclosure may be thorough and complete, and so that the technical idea of the present disclosure may be sufficiently delivered to a skilled person in the art.

In the present disclosure, when an element is described to be disposed on another element, it means that the element is directly mounted or formed on the other element, or that a third element may be interposed between the element and the other element. Further, in the drawings, the thickness of the layers and regions may be exaggerated to provide effective explanation of the technical features.

Also, in the preferred embodiments of the present disclosure, a series of numerical terms such as 'a first,' 'a second' and 'a third,' and the like, may be used to describe a variety of elements; however, it is to be understood that these numerical terms are not used to limit the described elements. These numerical terms are only used to identify one element from another. Accordingly, a first element in one embodiment may be referred to as a second element in another embodiment. It is also to be understood that each of the embodiments described and illustrated herein includes its complementary embodiments. In the present disclosure, the expression 'and/or' refers to the meaning of including 'at least one of' the elements described before and after thereof.

In the present disclosure, an element may be described in singular form only;

however, it is to be understood that such description also includes the meaning that the element may exist in plural form, unless otherwise defined contextually. Further, expressions such as "comprise," "include," "have," or their conjugation, are used to define the existence of technical features, numbers, elements or an assembly thereof, not to exclude the possibility of the existence or addition of one or more other technical features, numbers, steps elements or an assembly thereof. Furthermore, in the present disclosure, the expression "connect," or its conjugation, is used as a meaning that includes both an indirect and a direct connection of a plurality of elements.

Also, in the following description, when a detailed explanation of known related function or structure is deemed to cloud the essentials of the present disclosure, such detailed explanation will be omitted.

Figure 2:
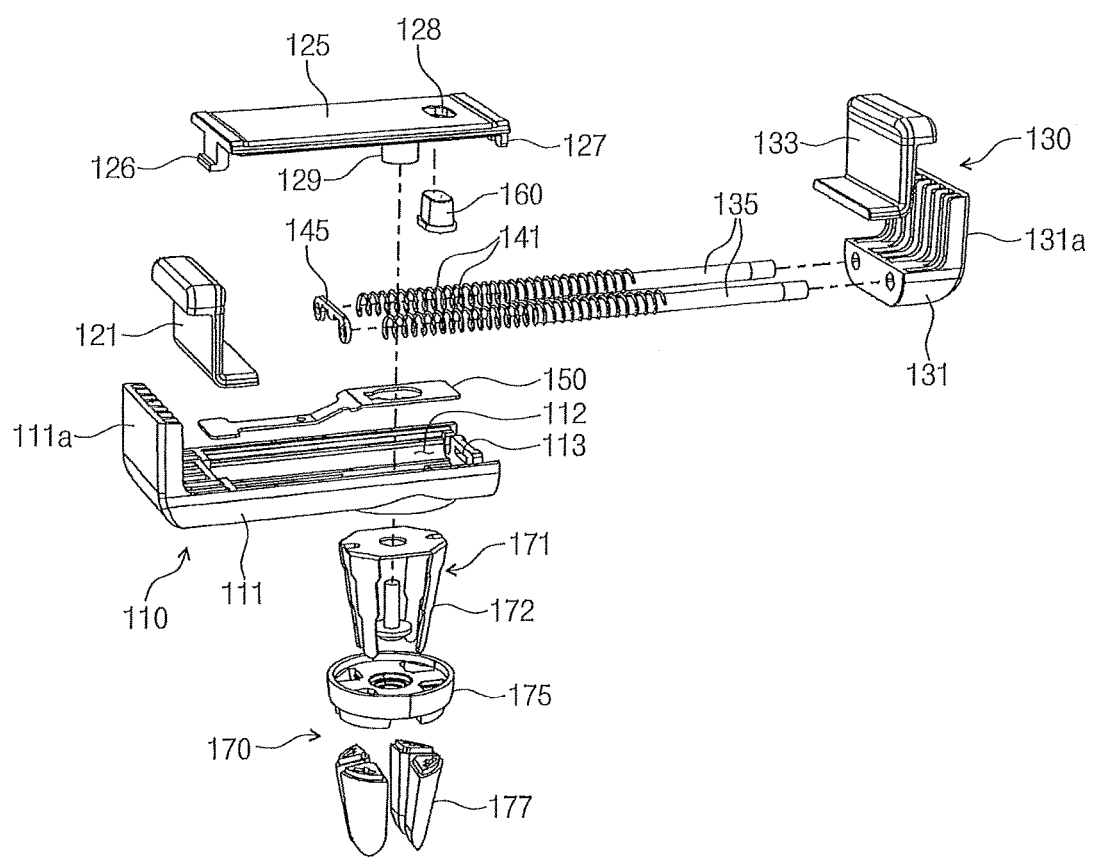
FIG. 2 is an exploded perspective view of the holder shown in FIG. 1.

FIG. 1 is a perspective view of a holder for holding a portable device according to one exemplary embodiment of the present disclosure; FIG. 2 is an exploded perspective view of the holder for holding a portable device shown in FIG. 1; and FIG. 3 is a perspective cross-sectional view which illustrates a portion of the holder for holding a portable device shown in FIG. 1.

Figure 3:
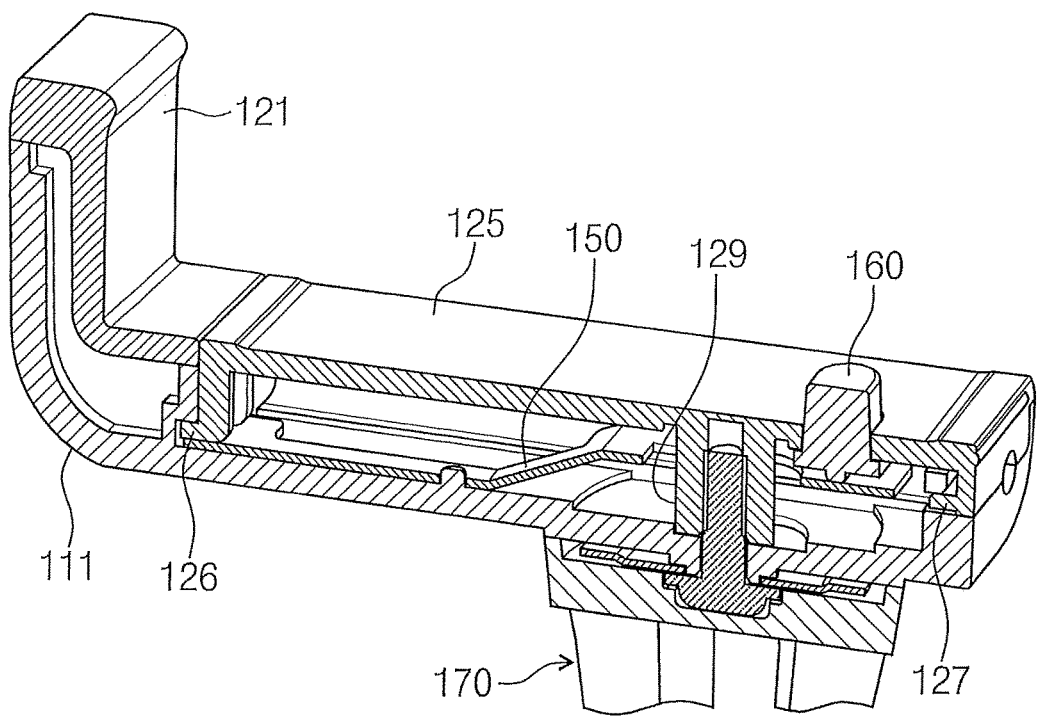
FIG. 3 is a perspective cross-sectional view which illustrates a portion of the holder shown in FIG. 1.

Referring to FIGS. 1-3, a holder for holding a portable device (10; hereinafter referred to as 'the holder') is installed inside a vehicle, and used for holding a portable device. The holder (10) may be installed to a variety of places inside a vehicle. In the exemplary embodiment, the holder (10) may be installed to an air-outlet grille in a vehicle. The portable device is a small-sized terminal device which a passenger of a vehicle could carry, and includes a mobile phone, a smart phone, a tablet PC, a navigation device, a GPS device, and the like.

The holder (10) comprises a body portion (110), a moving portion (130), an elastic plate (150), a button (160), and a tongs portion (170). The body portion (110) is where the portable device is placed. The moving portion (130) moves in one direction relative to the body portion (110) to secure a space where the portable device is to be placed, and to support the portable device once it is placed. The elastic plate (150) restricts the movement of the moving portion (130) to a fixed state. The button (160) is configured to push the elastic plate (150) in order to release the fixed state of the moving portion (130) to a movable state. The tongs portion (170) fixes the body portion (110) to an air-outlet grille in a vehicle. Hereinafter, each element will be described in more detail.

The body portion (110) includes a body (111), a fixed pad (121), and a cover (125).

The body (111) is provided as a main area where the portable device is placed. The body (111) may be made of a plastic material. The body (111) has an open top surface, and a guide groove (112) provided on the inside thereof. The guide groove (112) is provided linearly in one direction parallel with a moving direction of the moving portion (130). The guide groove (112) may be provided as a pair, two guide grooves arranged side by side in parallel with each other. A spring (141) is placed in each guide groove (112). One end (111a) of the body (111) is bent to protrude upwardly.

The fixed pad (121) is fixedly engaged to with one end of the body (111). The fixed pad (121) supports one end of the portable device. The fixed pad (121) may be made of an elastic material. For example, the fixed pad (121) may be made of a rubber material. The fixed pad (121) prevents the damages to the portable device which may be caused by collision or impact.

Figure 4:
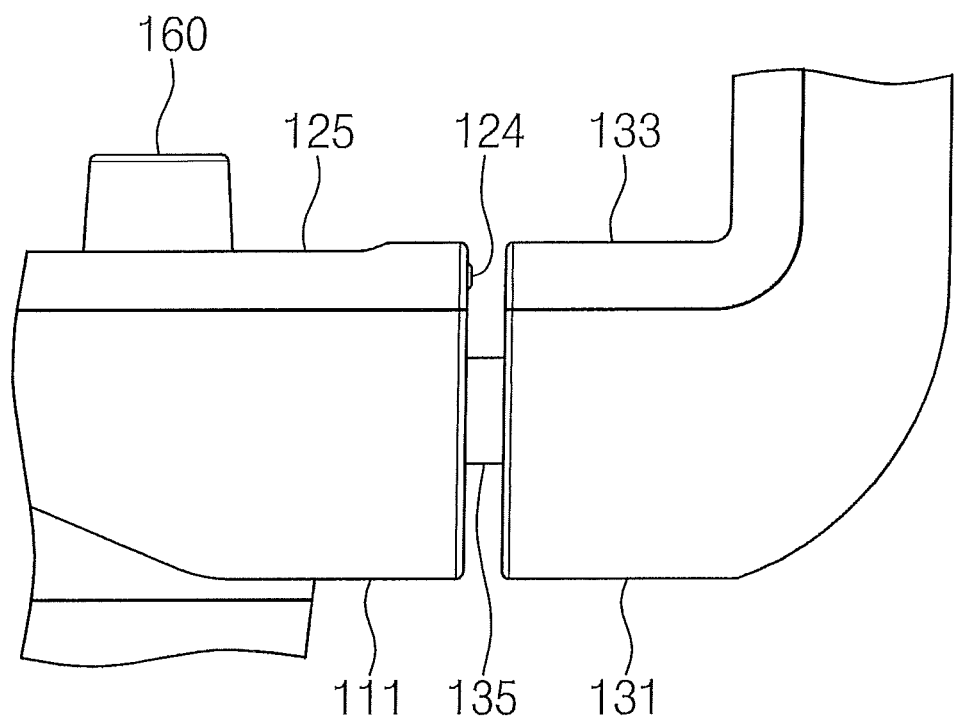
FIG. 4 is an enlarged view of a portion of the holder shown in FIG. 1.

The cover (125) covers the open top surface of the body (111). The top surface of the cover (125) is flat, and engagement protrusions (126, 127) are provided on both ends, protruding downwardly from the cover (125). When assembled with the body (111), the engagement protrusions (126, 127) are engaged with the engagement groove (113) formed on the body (111). A button hole (128) is provided on the cover (125). The button hole (128) may be provided in an area adjacent to a moving pad (133). As shown in FIG. 4, an impact reduction pad (124) is provided on one side of the cover (125). The impact reduction pad (124) is provided to relieve the impact caused by a collision with the moving pad (133) when the moving portion (130) is in linear movement.

The moving portion (130) includes a moving base (131), the moving pad (133), a moving shaft (135), the spring (141), and a fixing clip (145).

The moving base (131) is provided on the other side of the body (111), far away from the fixed pad (133). One end (131a) of the moving base (131) protrudes upwardly. One end (131a) of the moving base (131) and one end (111a) of the body (111) face each other.

The moving pad (133) is fixedly engaged with the moving base (131). The moving pad (133) is combined with the fixed pad (121) to support the portable device. The moving pad (133) and the fixed pad (121) may be formed to have the same shape, using the same material. The moving pad (133) of this embodiment is configured to prevent the damages to the portable device which may be caused by collision or impact.

The moving shaft (135) has a rod-like shape, and is linearly arranged along a moving direction of the moving pad (133). One end of the moving shaft (135) is fixedly engaged with the moving base (131). In this embodiment, the moving shaft (135) is provided as a pair, two moving shafts arranged side by side in parallel with each other.

The spring (141) is placed in the guide groove (112), and inserted into the moving shaft (135). In this embodiment, the spring (141) is provided as a pair, each spring inserted into the respective moving shaft (135).

Figure 5:
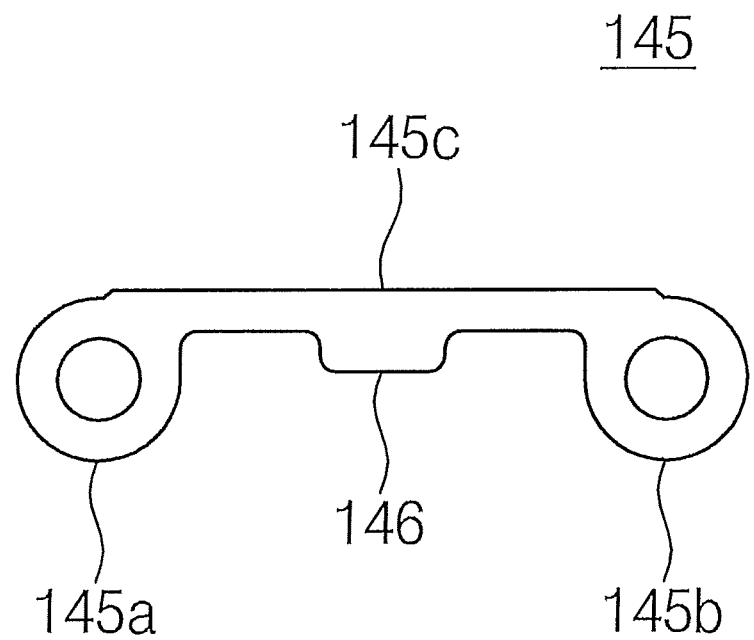
FIG. 5 is a front view of a fixing clip.

FIG. 5 is a front view of the fixing clip (145). Referring to FIGS. 2 and 5, the fixing clip (145) is fixed to the other end of the moving shaft (135), and blocks the spring (141) from falling out of the moving shaft (135). The fixing clip (145) is provided with a stopper protrusion (146). The stopper protrusion (146) may be held by a stopper portion (157) of the elastic plate (150), and in such case, the movement of the moving portion (130) is restricted to a fixed state. The fixing clip (145) has a first engagement region (145a), a second engagement region (145b), and a fixed region (145c). The first engagement region (145a) and the second engagement region (145b) are regions which respectively become engaged with the other end of the moving shaft (135). The fixed region (145c) is a region which connects the first engagement region (145a) and the second engagement region (145b), and is provided with a stopper protrusion (146).

The elastic plate (150) is disposed inside the body (111), between the body (111) and the cover (125). The elastic plate (150) is a thin elastic plate. The elastic plate (150) may be made of a plastic or metallic material.

Figure 6:
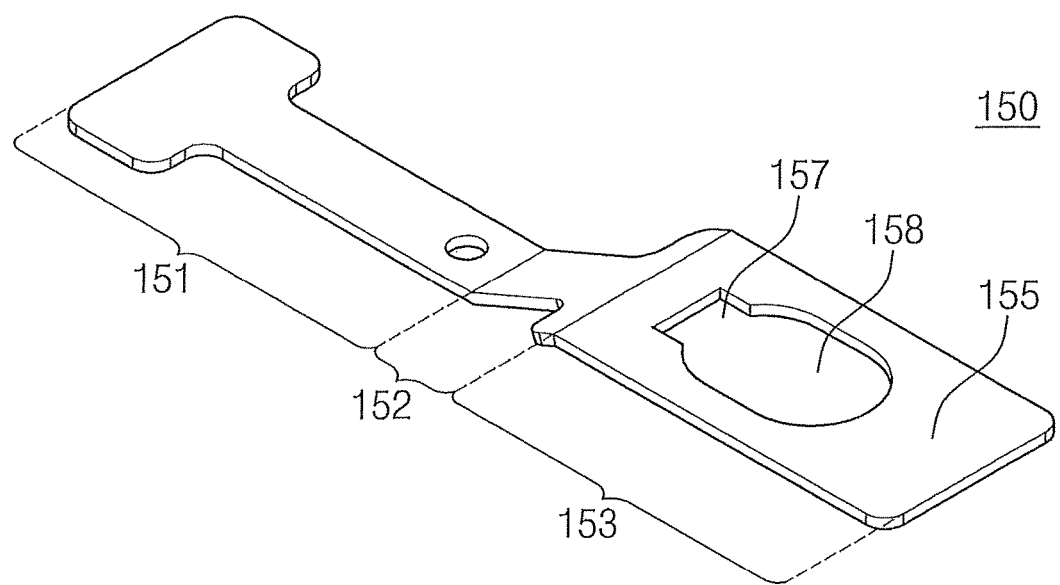
FIG. 6 is a perspective view of an elastic plate.

FIG. 6 is a perspective view of the elastic plate. Referring to FIGS. 2 and 6, the elastic plate (150) has a first region (151), a second region (152) and a third region (153). The first region (151) is a region which is in close contact and fixed to the body (111), and is provided linearly in one direction. The second region (152) extends in an upwardly inclining manner from one side of the first region (151). The third region (153) extends from one side of the second region (152) in the same direction as the length direction of the first region (151). The third region (153) is spaced apart from the body (111) at a predetermined distance. With these structural characteristics of the elastic plate (150), the third region (153) is capable of elastically moving up and down relative to the first region (151).

The elastic plate (150) is provided with a push portion (155), a stopper portion (157) and an insertion hole (158). In this embodiment, the push portion (155), the stopper portion (157) and the insertion hole (158) are provided in the third region (153). The push portion (155) is where the lower end of the button (160) is to be placed, and when the button (160) is pushed, the push portion is pushed downward together with the button (160). The stopper portion (157) is a hole formed to have a predetermined width, and the stopper protrusion (146) of the fixing clip (145) is inserted therethrough. A fastener (129), which is formed on the undersurface of the cover (125), is inserted through the insertion hole (158).

The button (160) is inserted through the button hole (128), the lower end of the button placed on the push portion (155) of the elastic plate (150) and the upper end of the button protruding over the top surface of the cover (125). The button (160) is pushed by the portable device, while the portable device is being placed on the cover (125).

The tongs portion (170) is engaged with the body (111) at a lower portion of the body (111). The tongs portion (170) includes a tongs clip (171), a holder (175) and tongs legs (177).

The tongs clip (171) is made of an elastic material. The tongs clip (171) may also be made of a metallic material. The togs clip (171) has a plurality of leg portions (172). In this embodiment, the tongs clip (171) has four leg portions. The leg portions of the tongs clip (171) are respectively inserted into a holder (175), and an end portion thereof protrudes below the holder (175).

The holder (175) is configured so that a predetermined distance is maintained among the leg portions (172) of the tongs clip (171).

The tongs legs (177) are respectively inserted into the leg portions (172) of the tongs clip (171). The tongs legs (177) may be made of a different material from the tongs clip (171). The tongs legs (177) may be made of a rubber material. With is, the tongs legs (177) are able to prevent the damages to the interior of the vehicle which may be caused by collision or impact. The tongs legs (177) are inserted into an air-outlet grille of the vehicle, and thereby the holder (10) is securely fixed to the vehicle.

Herein, a process of using the above-described holding holder to hold a portable device will be explained.

Figure 7:
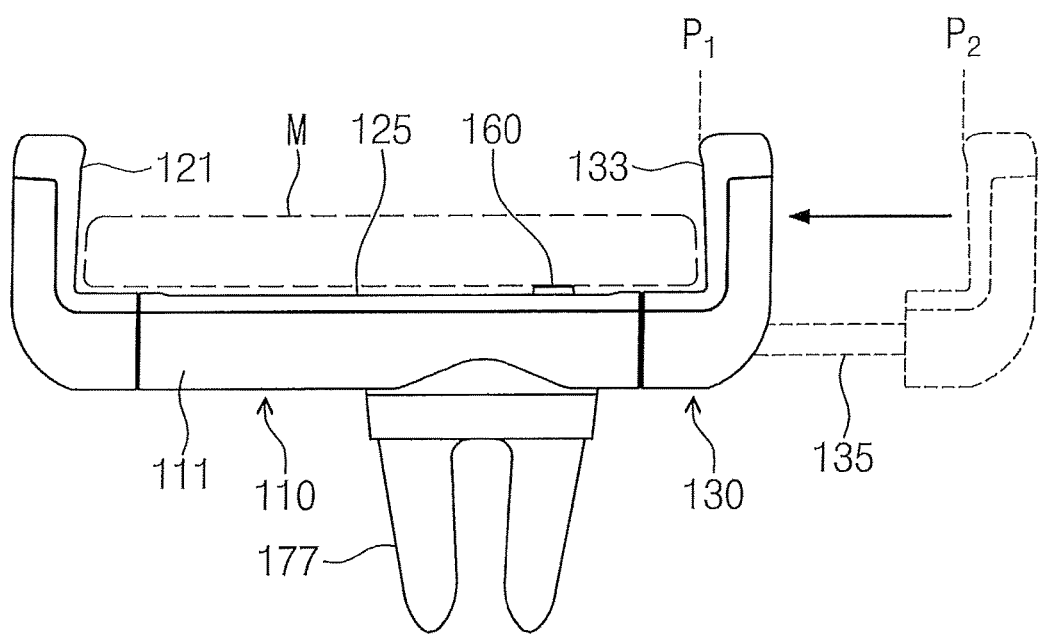
FIG. 7 is a drawing which shows a process of movement of a moving portion according to the present disclosure.
Figure 8:
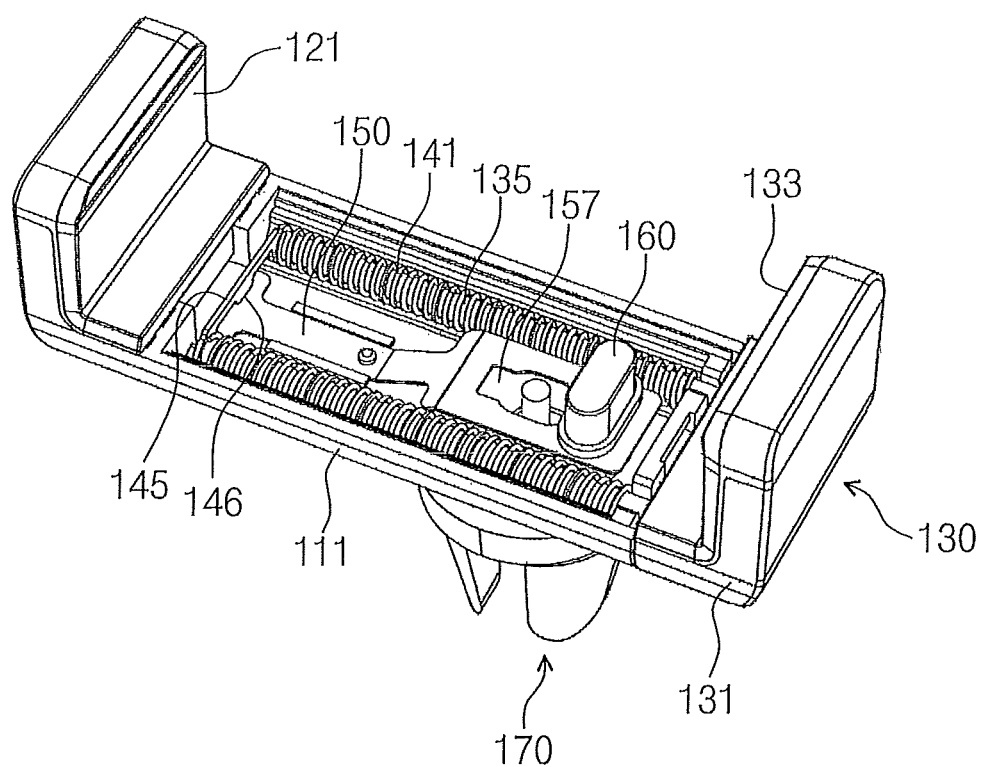
FIG. 8 is a drawing which shows the moving pad located at a position that corresponds to the width of the portable device.

FIG. 7 is a drawing which shows a process of movement of the moving portion according to this embodiment; FIG. 8 is a drawing which shows the moving pad located at a position which corresponds to the width of the portable device; and FIG. 9 is a drawing which shows the moving pad located at a position wider than the width of the portable device.

Figure 9:
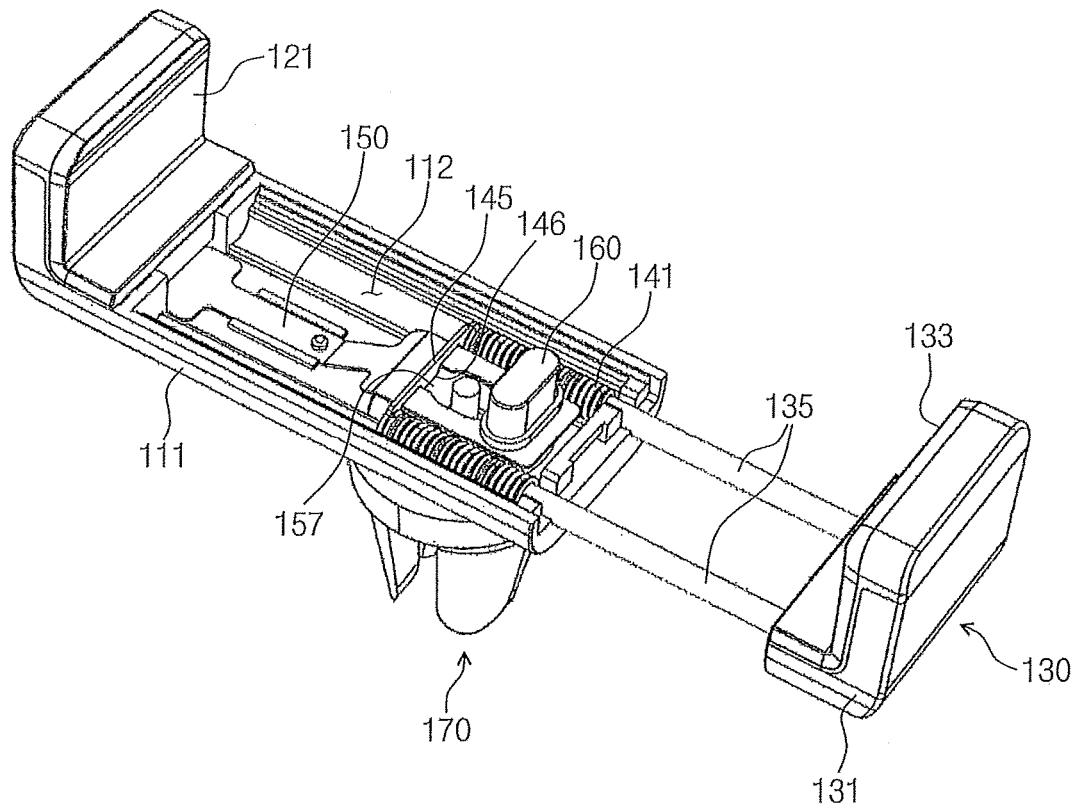
FIG. 9 is a drawing which shows the moving pad located at a position that is wider than the width of the portable device.

Referring to FIGS. 7~9, the moving pad (133) is linearly movable between a first position (P1) and a second position (P2). The first position (P1) is where the interval distance between the moving pad (133) and the fixed pad (121) corresponds to one width of a portable device (M). The moving pad (133) is assembled with the fixed pad (121) at the first position (P1) and holds the portable device (M). The second position (P2) is where the interval distance between the moving pad (133) and the fixed pad (121) is wider than one width of the portable device (M). Here, a user moves the moving portion (130) so that the moving pad (133) is located at the second position, (P2) and then places the portable device (M) on the body portion (110). Since the interval distance between the moving pad (133) and the fixed pad (121) at the second position (P2) is wider than the width of the portable device, a user may place the portable device (M) on the body portion (110) free from the interference of the moving pad (133) and the fixed pad (121).

As shown in FIG. 9, when a user holds the moving portion (130) by the hand and moves the moving pad (133) to the second position (P2), the moving shaft (135) moves to the outer side of the body portion (110) with the moving base (131), a portion of the moving shaft stays inside the body portion (110). During this process, the fixing clip (145) move outward with the moving shaft (135), and thereby the spring (141) is compressed. The fixing clip (145) is movable up to a position where the stopper portion (157) is located, and the stopper protrusion (146) is caught by the stopper portion (157), thereby restricting the movement of the moving portion (130). Even when a user takes the hand off of the moving portion (130), the stopper protrusion (146) is still caught by the stopper portion (157), and therefore the moving portion (130) is not retrieved back to the first position (P1), and the spring (141) is maintained in a compressed state.

Next, a user places the portable device (M) on the body portion (110) while the moving portion (130) is located at the second position (P2). In the process in which the portable device (M) is placed on the top surface of the cover (125), the button (160) is pushed by the portable device (M), and thereby the button (160) pushes the push portion (155) of the elastic plate (150) which is disposed at the lower end of the button. With the push portion (155) of the elastic plate (150) pushed downward, the stopper portion (157) is moved downward and releases the stopper protrusion (146), thereby delivering the elastic force of the spring (141) to the fixing clip (145). The elastic force of the spring (141) moves the fixing clip (145) toward the fixed pad (121) and in this process, the moving shaft (135), the moving base (131) and the moving pad (133) move together therewith. As shown in FIG. 8, the moving pad (133) moves to the first position (P1), and thereby secures one side portion of the portable device (M).

With the process described above, a user may easily place the portable device (M) to the holder (10). When a driver uses the holder (10) of the present disclosure to place the portable device while driving a vehicle or while the vehicle is standing, it is possible to use only one hand to place the portable device (M). When a user holds the moving portion (130) with one hand and moves it in one direction, the stopper protrusion (146) is caught by the stopper portion (157) during the movement, and thereby the moving portion (130) is automatically fixed at the second position (P2). With this, a user is not required to perform a separate movement or motion to secure the moving portion (130), and therefore the entire process can be operated with only one hand.

Further, since the button (160) is pushed by the portable device (M) when the portable device (M) is placed on the cover, it is possible to move the moving portion (130) to the first position (P1) just by placing the portable device (M) on the cover (125). That is, a motion to move the moving portion (130), for example, pushing a release button, or the like, is not required of a user, and therefore a user may simply place the portable device (M) with only one hand.

Also, since the portable device (M) is held by the movement of the moving portion (130), the first position (P1), which is where the portable device (M) is secured, may become different in accordance with the size of the portable device (M). Thus, the holder (10) is capable of holding the portable device (M) in various sizes.

Figure 10:
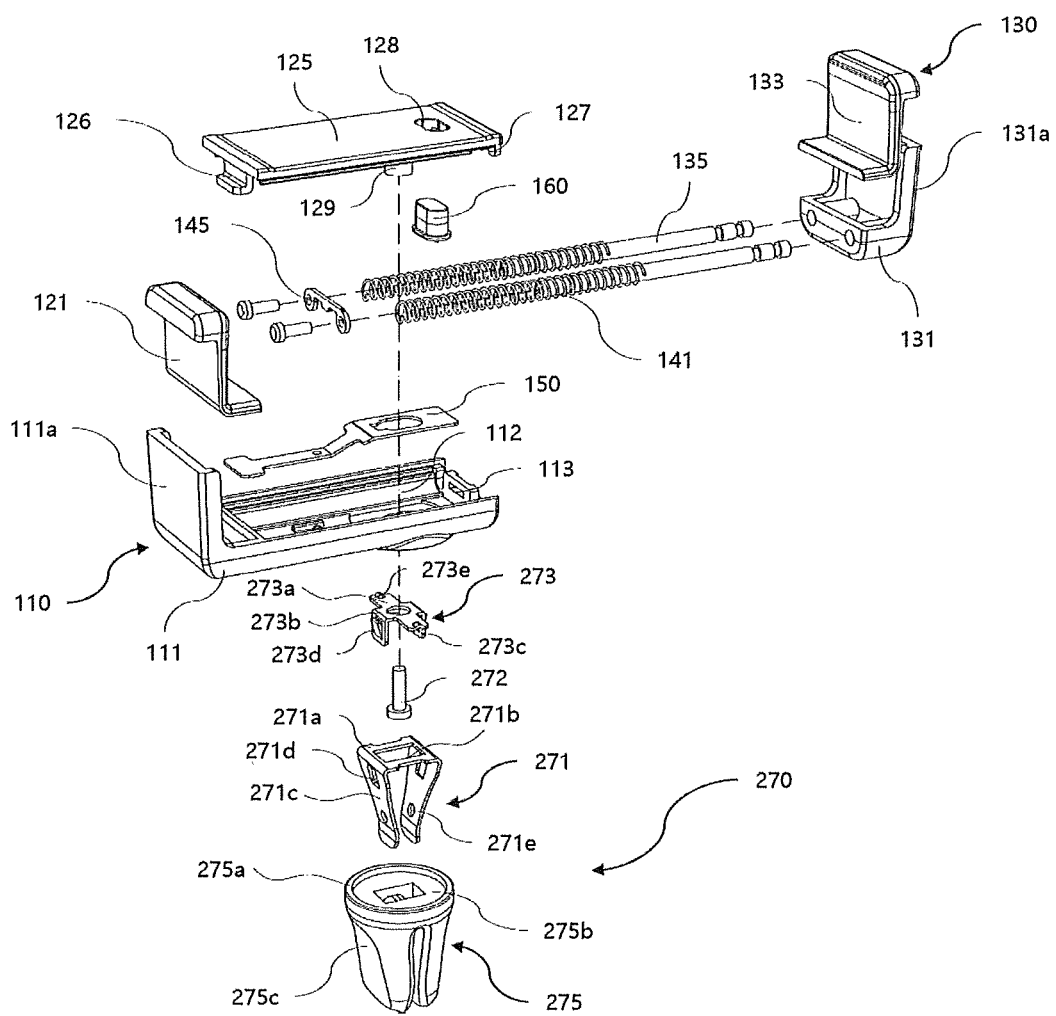
FIG. 10 is an exploded perspective view of a second embodiment of a holder for holding a portable device, wherein the holder includes a second tongs portion.
Figure 11:
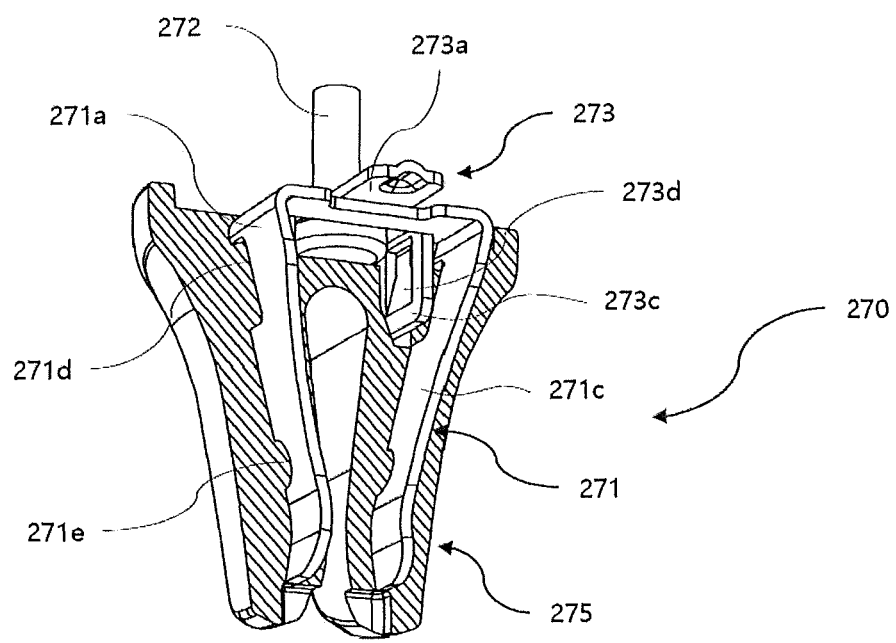
FIG. 11 is a vertical cross-section through the second tongs portion of the holder of FIG. 10.
Figure 12:
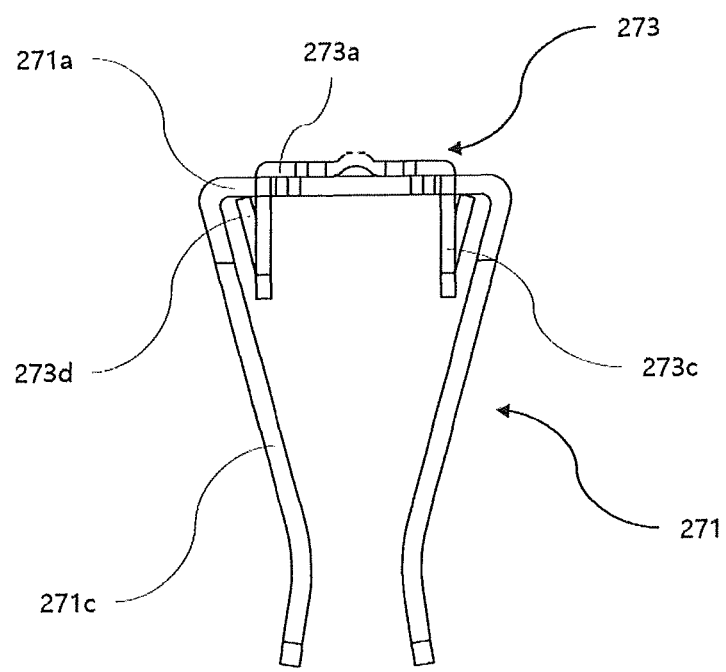
FIG. 12 is a front elevation view of a tongs clip of the holder showing the coupling relationship between the tongs clip and a coupling clip.

A second embodiment of a holder for portable devices is shown in FIGS. 10-12. The second embodiment of the holder is substantially identical to the holder depicted in FIGS. 1-9 except that the second embodiment of the holder shown in FIGS. 10-12 has a second tongs portion (270) instead of a tongs portion (170). All other components of the second embodiment of the holder are substantially identical to the holder shown in FIGS. 1-9. In other words, the second embodiment of the holder includes a body portion 110 and a moving portion 130 that are substantially identical to the body portion 110 and moving portion 130 shown in FIGS. 1-9.

As shown in FIG. 10, the second tongs portion (270) comprises a tongs clip (271), a coupling clip (273) and a tongs holder (275). The second tongs portion (270) is coupled to a lower side of the body portion 110 by a fixing bolt (272). In particular, the coupling clip (273) is coupled to the body (111) of body portion 110 by the fixing bolt (272) in order to secure the tongs clip (271) and the tongs holder (275) to the body (111). The tongs clip (271) and coupling clip (273) are coupled to each other and are insert-injected into the tongs holder (275).

The tongs clip (271) comprises a tongs main body (271a) within which is defined a tongs main body hole (271b); and a pair of tongs legs (271c) that extend outwardly and downwardly from opposite sides of the tongs main body (271a). The tongs main body (271a) is generally U-shaped when viewed from the front. An upper hole (271d) and a lower hole (271e) are defined in each of the tongs legs (271c).

The tongs clip (271) may be fabricated from metal as a single, unitary plate that may be bent or shaped to form the tongs main body (271a) and the pair of tongs legs (271c). Alternatively, the tongs clip (271) may be molded from metal or another suitable material to form the tongs main body (271a) and the pair of tongs legs (271c). The tongs main body (271a) may be coupled to the coupling clip (273) as will be described hereafter to allow the tongs clip (271) to be coupled to the coupling clip (273).

The tongs main body hole (271b) may be defined generally in a central region of the tongs main body (271a) and extend between an upper face and a lower face of the tongs main body (271a). The tongs main body hole (271b) may provide a path along which the coupling clip (273) may be coupled to the tongs main body (271a).

The tongs legs (271c) are formed to extend from opposite sides of the tongs main body (271a). The tongs legs (271c) extend outwardly from a lower face of the tongs main body (271a) in generally the same direction and the two tong legs (271c) initially angle inwardly towards each other for a distance and then the free ends of the tong legs (271c) may angle outwardly away from each other as can be seen in FIG. 12. The free ends of the tong legs (271c) are, however, spaced closer to each other than are the regions of the tong legs (271c) that connect to the tongs main body (271a). The tongs legs (271c) are formed to be of a certain height so as to have a coupling strength required for preventing the tongs clip (271) from separating from the tongs holder (275).

In each tongs leg (271c), the upper hole (271d) is defined at an upper portion of each leg adjacent to the tongs main body (271a) and penetrates the tongs leg (271c) from an exterior face to an interior face. The upper hole (271d) provides a path through which a molding material flows used for forming the tongs holder (275) in an insert-molding or injection-molding process, as will be described later herein. The upper hole (271d) assists in preventing the tongs holder (275) from being pulled out from the tongs clip (271) as will be described later herein.

In each tongs leg (271c), the lower hole (271e) is defined a distance vertically below the upper hole (271d) and proximate a free end of the tongs leg (271). Each lower hole (271e) penetrates the tongs leg (271c) from an exterior face to an interior face. The lower hole (271e) provides a path through which resin material used for forming the tongs holder (275) in an injection molding process for &truing the tongs holder (275) flows. The lower hole (271e) also assists in preventing the tongs holder (275) from being pulled out from the tongs clip (271) as will be described later herein.

As depicted in FIGS. 10-12, the coupling clip (273) is a generally U-shaped component when viewed from the front. The coupling clip (273) comprises a coupling main body (273a) within which is defined a coupling main body hole (273b). The coupling clip (273) also comprises a pair of coupling legs (273c) each having an angled coupling plate (273d) provided on an exterior surface thereof. In addition, the coupling main body (273a) may include one or more coupling protrusions (273e) that extend upwardly from an upper face of the coupling main body (273a) and are located on either side of the coupling main body hole (273b). The coupling clip (273) may be fabricated from a metal as a single, unitary plate and may be bent or shaped to form the coupling clip main body (273a) and the pair of coupling legs (273c). The coupling clip (273) may, alternatively, be formed from any other suitable material in any manner, such as molding. The coupling plates (273d) may be formed to have a rectangular shape when viewed from the side. When viewed from the front, the coupling plates (273d) angle outwardly from the coupling legs (273c) and each coupling plate (273d) extends further outwardly from the associated coupling leg (273c) proximate the coupling main body (273a) than proximate a free end of the associated coupling leg (273c). The coupling clip (273) is coupled to the tongs clip (271) by inserting the coupling legs (273c) of the coupling clip (273) into the tongs main body hole (271b) of the tongs clip (271). When the coupling legs (273c) are inserted into the tongs main body hole (271b), the coupling legs (273c) are received into a space defined between the interior surfaces of the spaced apart tongs legs (271c. The coupling plate (273d) on each of the coupling legs (273c) is spaced a small distance away from an interior surface of the adjacent tong leg (271c) as is shown in FIG. 11. When the coupling legs (273c) are inserted through the tongs main body hole (271b), the coupling legs (273c) are initially deflected inwardly towards each other and then elastically return to their original shape and position under spring force when the insertion is completed. When the coupling legs (273c) are received through the tongs main body hole (271b) each of the coupling legs (273c) is located a distance laterally away from one of the pair of tongs legs (271c) and the two coupling legs (273c) are located between the two tongs legs (271c).

When the coupling legs (273c) are received through the tongs main body hole (271b), a lower face of the coupling main body (273a) is positioned adjacent an upper face of the tongs main body (271a). The coupling plates (273d) each have an upper end and a lower end and the upper ends extend outwardly for a distance from the exterior surface of the associated coupling leg (273c). The upper ends of the coupling plates (273d) therefore project outwardly for a distance beyond the coupling legs (273c) and prevent the coupling clip (273) from being withdrawn through the tongs main body hole (271b). This is because the upper ends of the coupling plates (273d) will tend to engage the lower face of the tongs main body (271) and prevent disengagement of the coupling clip (273) from the tongs clip (271).

The coupling main body (273a) may be coupled to the body (111) by means of a securing bolt (272) that is inserted through the coupling main body hole (273b). When the coupling clip (273) is coupled to the tongs clip (271), the coupling main body (273a) is placed on the upper face of the tongs main body (271a). The coupling main body hole (273b) may be formed at a center of the coupling main body (273a). The coupling main body hole (273b) may be arranged coaxially with the tongs main body hole (271b). The coupling main body hole (273b) provides a path through which the securing bolt (272) for coupling the second tongs portion (270) to the body (111) passes. The coupling main body hole (273b) is formed to have a diameter smaller than that of a head of the securing bolt (272). The securing bolt (272) is inserted in and coupled to the coupling main body hole (273b) to allow the head of the securing bolt to be placed on a lower face of the coupling main body (273a). The securing bolt (272) couples the coupling clip (173) to the body (111) as shown in FIG. 10.

As indicated earlier, portions of both sides of the coupling main body (273a) are shaped to form the coupling elastic protrusions (273e). After the coupling main body (273a) is secured to the body (111) by the securing bolt (272), the securing bolt (272) is retained in place and applies force on the coupling elastic protrusion (273e) so that the coupling elastic protrusion (273e) applies force on a bottom portion of the body (111) to prevent the body (111) from accidentally rotating and thereby shifting the orientation of a portable device that is engaged in the holder.

The tongs holder (275) comprises a holder main body (275a) and holder legs (275c). The holder main body (275a) and the holder legs (275c) may be formed from a resilient or elastic material such as rubber or resin, although any other suitable material may be used. The tongs holder (275) may be formed by insert-molding or any other suitable process such as injection molding. Tongs holder (275) is molded around tongs clip (271) and around coupling clip (273) and around the head of the fixing bolt (272). The molding material surrounds or envelops the tongs legs (273c) of the tongs clip (271) and the coupling legs (273c) of the coupling clip (273) and the head of the fixing bolt (272). Molding material flows through the upper hole (271d) and lower hole (271e) of the tong legs (271c) and into the space between the projections (273d) and thereby secures the holder (275), the tongs clip (271), and the coupling clip (273) together. The molding material aids in preventing the holder (275), the tongs clip (271) and the coupling clip (273) from separating from each other.

The holder main body (275a) may be formed so as to have a circular cross-section and includes a main body recess (275(b) that is large enough to receive the tongs main body (271a) therein. The holder main body recess (275b) is defined in an upper face of the holder main body (275a) and is complementary to a lower portion of the body (111). The complementary portion of the body (111) is inserted in the holder main body recess (275b) when the tongs portion (170) is coupled to the body (111). The holder main body recess (275b) of the holder main body (275a) receives the tongs main body (271a) therein along with an upper portion of the tongs legs (271c) and the head of the securing bolt (272). The upper face of the tongs main body (271a) of the tongs clip (271) and the coupling main body (273a) of the coupling clip (273) are exposed on a bottom face of the holder main body recess (275b).

Two holder legs (275c) extend in a downward direction from a lower face of the holder main body (275a) and these legs may angle slightly towards each other so that their free ends remote from the holder main body (275a) are closer to each other than are the regions of the legs proximate the holder main body (275a). The holder legs (275c) are spaced from each other with respect to a center of the holder main body (275a). Each holder leg (275c) is formed to entirely surround one of the tongs legs (271c). The holder legs (275c) are coupled to an air-outlet grille of a vehicle in the same fashion to the holder legs (177) of the first embodiment (FIG. 2) in order to secure the second embodiment of the holder for the portable device to a dashboard of a vehicle.

A first method of holding a portable device on an air-outlet grille on a vehicle comprises steps of a) providing a holder (10) that has a body portion (110) having a fixed pad (121), a moving portion (130) having a moving pad (133) movable between a first position (P1) and a second position (P2), an elastic plate (150) adapted to restrict movement of the moving pad (133) at the second position (P2), a button (160) that is depressible to release the moving pad (133) and a tongs portion (170); b) inserting a grille from the air-outlet grille into a space defined between a pair of legs (177) provided on the tongs portion (170); c) securing the grille between the pair of legs (177); d) moving the moving pad (133) of the body portion (110) away from the fixed pad (121); e) positioning a first side of the portable device against the fixed pad (121) of the body portion (110) of the holder (10); f) depressing the button (160) provided on the body portion (110) of the holder (10) with the portable device; g) moving the moving pad (133) on the body portion (110) toward the fixed pad (121) and towards the first position (P1); h) engaging a second side of the portable device with the moving pad (133); and i) clamping the portable device between the moving pad (133) and the fixed pad (121).

A second method of holding a portable device on an air-outlet grille on a vehicle comprises steps of a) providing a holder (10) that has a body portion (110) with a fixed pad (121) and a moving pad (133); and a tongs portion (270) extending outwardly from the body portion (110); wherein the tongs portion (270) comprises a tongs clip (271), a coupling clip (273); and a tongs holder (275); wherein the tongs clip (271) is engaged with the tongs holder (275) and wherein the coupling clip (273) secures the tongs clip (271), and the tongs holder (275) to the body portion (110); b) inserting a grille from the air-outlet grille into a space defined between a pair of holder legs (275c) provided on the tongs holder (275); c) clamping the grille between the holder legs (275c); d) moving the moving pad (133) of the body portion (110) away from the fixed pad (121); e) positioning a first side of the portable device against the fixed pad (121) of the body portion (110) of the holder (10); f) depressing a button provided on the body portion (110) of the holder (10) with the portable device; g) moving the moving pad (133) on the body portion (110) toward the fixed pad (121) thereon,; h) engaging a second side of the portable device with the moving pad (133); and i) clamping the portable device between the moving pad (133) and the fixed pad (121).

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

What is claimed is:

1. An apparatus for holding a portable device, comprising;
   a body portion on which the portable device is placed, the body portion comprising:
   a fixed pad for supporting a first side of the portable device when the portable device is placed thereon;
   a moving portion having a moving pad that is linearly movable between a first position and a second position; wherein the moving portion supports a second side of the portable device when placed on the body portion, and wherein the second position is spaced a predetermined distance from the first position;
   an elastic plate that restricts a movement of the moving pad at the second position;
   a button depressible by the portable device when the portable device is placed onto the body portion, said button releasing the restriction of the movement of the moving pad caused by the elastic plate; and
   a tongs portion coupled to a lower region of the body portion, wherein said tongs portion is adapted to secure the body portion to an air-outlet grille on a vehicle; and wherein the tongs portion comprises
   a tongs clip;
   a coupling clip; and
   a tongs holder; wherein the tongs clip is engaged with the tongs holder, wherein the tongs holder is adapted to engage with the air-outlet grille, and wherein the coupling clip secures the tongs clip to the body portion.

2. The apparatus as defined in claim 1, wherein the tongs holder comprises:
   a holder main body; and
   a pair of holder legs extending outwardly from the holder main body; and wherein the pair of holder legs are adapted to receive a region of the air-outlet grille on the vehicle between them.

3. The apparatus as defined in claim 2, wherein the holder legs of the pair of holder legs angle inwardly toward each other.

4. The apparatus as defined in claim 2, wherein an upper face of the holder main body defines a recess therein, and wherein a portion of the tongs clip is received in the recess.

5. The apparatus as defined in claim 4, wherein the tongs clip comprises:
   a tongs main body; and
   a pair of tongs legs, and wherein the tongs main body is received in the recess.

6. The apparatus as defined in claim 5, wherein each of the pair of holder legs receives one of the pair of tongs legs therein.

7. The apparatus as defined in claim 6, wherein the tongs clip is fabricated from metal and the tongs holder is fabricated from a resilient material.

8. The apparatus as defined in claim 5, wherein the pair of tongs legs angle inwardly towards each other.

9. The apparatus as defined in claim 5, wherein the tongs main body defines a tongs main body hole therein, wherein the tongs main body hole extends from an upper face of the tongs main body to a lower surface of the tongs main body.

10. The apparatus as defined in claim 5, wherein at least one of the tongs legs defines at least one hole therein, and wherein the at least one hole extends from an exterior face to an interior face the at least one tongs legs.

11. The apparatus as defined in claim 10, wherein the tongs holder is molded around the tongs clip, and molding material used to mold the tongs holder flows through the at least one hole in the at least one of the tongs legs.

12. The apparatus as defined in claim 4, wherein the tongs holder is injection-molded or insert-molded around the tongs clip.

13. The apparatus as defined in claim 1, wherein the coupling clip comprises:
    a coupling main body; and
    a pair of coupling legs extending downwardly from the coupling main body in generally the same direction.

14. The apparatus as defined in claim 13, wherein the coupling main body defines a coupling main body hole therein, where the coupling main body hole extends between an upper face and a lower face of the coupling main body; and
    the tongs clip comprises a tongs main body and a pair of tongs legs that extend outwardly from the tongs main body; and wherein the tongs main body defines a tongs main body hole therein, and the tongs main body hole extends from an upper face of the tongs main body to a lower surface of the tongs main body; and wherein the holder further comprises:
    a fixing bolt having a shaft and a head; and wherein the shaft is received through the tongs main body hole and through the coupling main body hole and secures the tongs clip and the coupling clip to the body portion.

15. The apparatus as defined in claim 14, wherein the pair of coupling legs is received through the tongs main body hole, wherein each of the coupling legs is located a distance laterally away from one of the pair of tongs legs; and wherein the pair of coupling legs are located between the pair of tongs legs.

16. The apparatus as defined in claim 15, wherein one or both of the pair of coupling legs further comprises a coupling plate that angles outwardly from an exterior surface of the one or both of the coupling legs; and wherein the coupling plate prevents withdrawal of the pair of coupling legs through the tongs main body hole.

17. The apparatus as defined in claim 15, wherein a space is defined between the coupling plate and an interior surface of an adjacent one of the pair of tongs leg; and wherein the tongs holder is molded around the tongs clip and the coupling clip; and molding material used to mold the tongs holder is received around the pair of tongs legs, around the pair of coupling legs and in the space between the coupling plate and the adjacent one of the pair of tongs legs; and around a head of the fixing bolt.

18. The apparatus as defined in claim 13, wherein the coupling clip further comprises one or more coupling protrusions that extend upwardly from an upper surface of the coupling main body and towards the body portion.

* * * * *